UNITED STATES PATENT OFFICE.

EMIL COLLETT, OF NOTODDEN, NORWAY.

PROCESS OF MAKING A FERTILIZER.

No. 888,145.      Specification of Letters Patent.      Patented May 19, 1908.

Application filed July 10, 1905. Serial No. 269,081.

*To all whom it may concern:*

Be it known that I, EMIL COLLETT, a subject of Norway, residing at Notodden pr. Skien, Norway, have invented certain new and useful Improvements in the Manufacture of Fertilizers; and I do hereby declare the following to be a full, clear, and exact description of the invention, such as will enable others skilled in the art to which it appertains to make and use the same.

My invention relates to the production of a new and valuable fertilizer chiefly consisting of calcium nitrate.

As is well known, calcium nitrate is a very valuable fertilizer, but as it is in a very high degree hygroscopic, it is practically excluded from being used as such, because it cannot be evenly spread on the ground by mechanical means. Attempts have heretofore been made to transform the calcium nitrate into a state in which it is not hygroscopic, that is to say, into a state in which it will retain its powdery form.

My invention has for its object a very simple and effective means of producing a calcium nitrate fertilizer which is not hygroscopic.

According to my invention calcium nitrate, either in crystallized form or in solution, is mixed with calcium oxid, calcium sulfate, (gypsum) or equivalent matter, and the mixture thereupon heated at a temperature between 100° and 200° centigrade. If the calcium nitrate is in the form of a solution, it is evident that the mixture, before it is calcined, is suitably subjected to an evaporation process.

As a specific example, I take 100 parts by weight of calcium nitrate, in a substantially dry state, and mix it with 45 parts of calcium hydroxid and heat it in a pan to between 100 and 200 degrees centigrade.

When a solution is used, I take 200 kilos of calcium nitrate solution, containing about 150 kilos $Ca(NO_3)_2$, and mix it with 50 kilos of lime (when lime is used) or 190 kilos of burned calcium sulfate (when calcium sulfate is used), or 100 kilos of calcium carbonate (when a carbonate is used), all finely ground or pulverized, then evaporate to dryness and heat in a pan at a temperature between 100 and 200 degrees centigrade.

The product resulting from the heating process possesses the fertilizing qualities of pure calcium nitrate, and at the same time is not hygroscopic; it retains its powdery state and is therefore a suitable fertilizer.

I claim—

1. A process of producing non-hygroscopic fertilizer containing calcium nitrate, consisting in mixing calcium nitrate with calcium oxid, and heating the so obtained mixture to a temperature just below that at which nitrogen is given off.

2. A process of producing a non-hygroscopic fertilizer containing calcium nitrate, consisting in mixing a solution of calcium nitrate with calcium oxid, evaporating the moisture and heating the so obtained mixture to a temperature just below that at which nitrogen is given off.

3. A process of producing a non-hygroscopic fertilizer, which consists in mixing calcium nitrate with a fertilizing oxygen compound of calcium, and heating the mixture to a temperature below that at which nitrogen is given off.

In testimony that I claim the foregoing as my invention, I have signed my name in presence of two subscribing witnesses.

EMIL COLLETT.

Witnesses:
HENRY BORDEWICH,
ALFRED J. BRYN.